United States Patent
Teng et al.

(10) Patent No.: US 11,496,090 B2
(45) Date of Patent: Nov. 8, 2022

(54) LIGHT-MODULATING DEVICE

(71) Applicant: National Taiwan Normal University, Taipei (TW)

(72) Inventors: Tun-Chien Teng, Taipei (TW); Yu-Jia Zheng, New Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 400 days.

(21) Appl. No.: 16/795,957

(22) Filed: Feb. 20, 2020

(65) Prior Publication Data

US 2021/0265945 A1 Aug. 26, 2021

(51) Int. Cl.
*H02S 40/22* (2014.01)
*G02B 6/42* (2006.01)
*G02B 19/00* (2006.01)

(52) U.S. Cl.
CPC ............ *H02S 40/22* (2014.12); *G02B 6/4201* (2013.01); *G02B 19/0028* (2013.01); *G02B 19/0042* (2013.01)

(58) Field of Classification Search
CPC ... H02S 40/22; G02B 6/4201; G02B 19/0028; G02B 19/0042
See application file for complete search history.

(56) References Cited

U.S. PATENT DOCUMENTS

| 7,672,549 | B2* | 3/2010 | Ghosh | F24S 23/12 126/684 |
| 7,873,257 | B2* | 1/2011 | Morgan | H01L 31/0547 136/246 |
| 8,322,905 | B2* | 12/2012 | Parker | G02B 6/002 362/613 |
| 9,575,298 | B2* | 2/2017 | Teng | F24S 23/12 |
| 9,910,211 | B2* | 3/2018 | Kloeppel | G06F 3/0202 |
| 10,464,472 | B2* | 11/2019 | Irgang | B60R 1/00 |
| 2016/0133771 | A1* | 5/2016 | Pelletier | G02B 17/006 703/1 |

* cited by examiner

*Primary Examiner* — Arman B Fallahkhair
(74) *Attorney, Agent, or Firm* — Birch, Stewart, Kolasch & Birch, LLP

(57) ABSTRACT

A light-modulating device includes optical microstructures, each including a topmost layer, a bottommost layer, and in-between layers. The topmost layer extends in a first predetermined axis. The bottommost layer extends in a last predetermined axis which turns about a center axis such that an incident light beam passing through the topmost layer in an incident route is modulated to permit the light beam emitting from the bottommost layer to impinge upon a solar concentrator disposed below the light-modulating device along an impinging route different from the incident route. The in-between layers are sequentially turned about the center axis by an incremental degree toward the last predetermined axis.

8 Claims, 18 Drawing Sheets

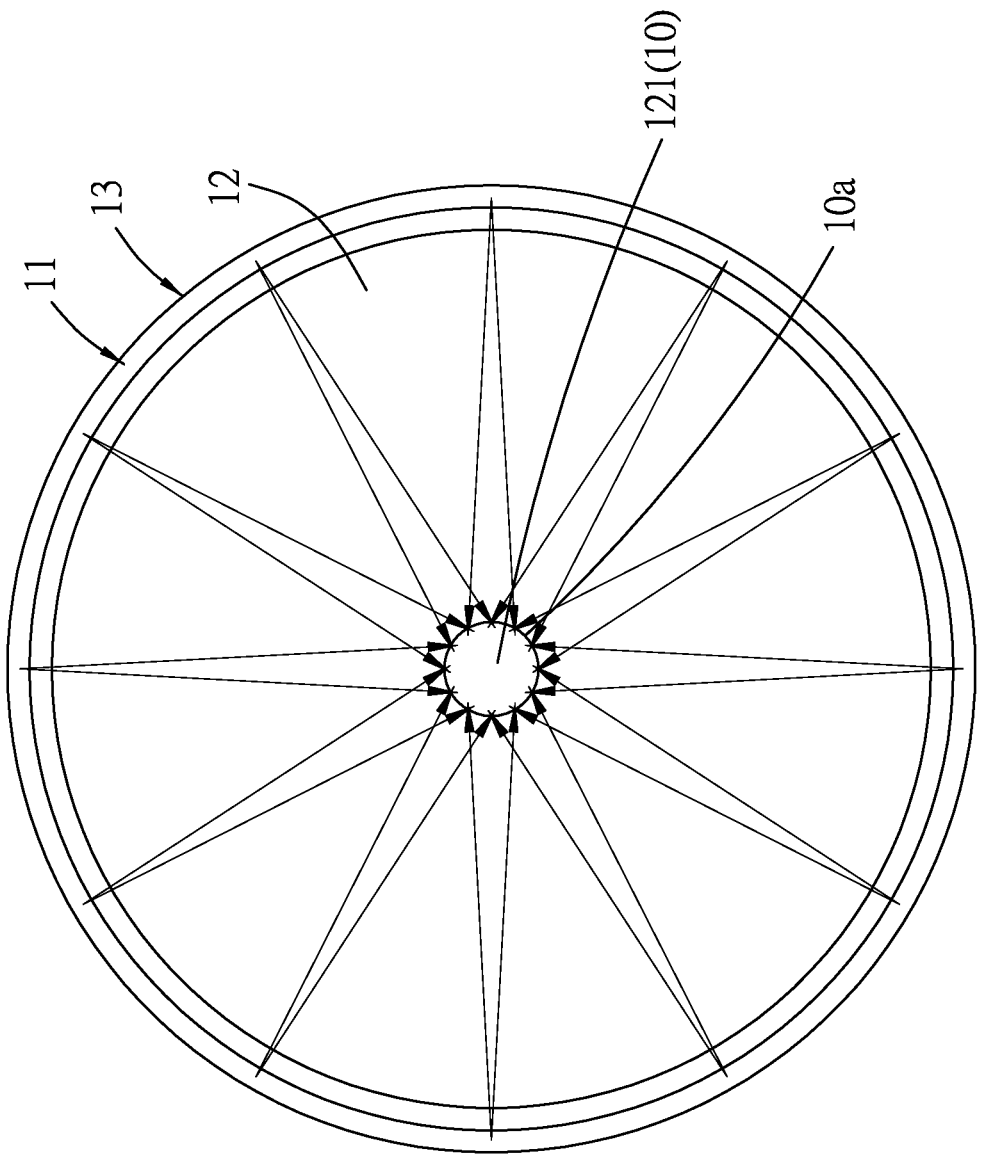

LIGHT-MODULATING DEVICE

FIELD

The disclosure relates to a light-modulating device, and more particularly to a light-modulating device adapted to be disposed on a solar concentrator.

BACKGROUND

Referring to FIGS. 1 to 3, a solar concentrator 1 (for example, a light-guide solar panel disclosed in U.S. Pat. No. 7,873,257) can be applied in a solar apparatus to concentrate sunlight. The solar concentrator 1 is configured as a circular plate, and includes a light-guide plate 12 having a central area 121 with a central axis C1, a photovoltaic chip module 10 disposed in the central area 121, and a plurality of annular optical elements 13 which are concentrically disposed on the light-guide plate 12 about the central axis (C1) and each of which has a parabolic reflective surface 131 to reflect incident light toward the light-guide plate 12. A light-incident surface 11 of the solar concentrator 1 is constituted by top surfaces of the annular optical elements 13. The photovoltaic chip module 10 is used as a solar energy collector for collecting the sunlight (i.e., the incident light) and converting the thus collected sunlight into electric energy. The photovoltaic chip module 10 has an annular outer surface 10a.

Referring to FIGS. 4 and 5, for convenient description, only the outermost one of the annular optical elements 13 is shown. After the sunlight impinging upon the light-incident surface 11 of the solar concentrator 1 in a direction normal to the light-incident surface 11 enters into the annular optical elements 13, the sunlight is guided through the annular optical elements 13, reflected by the parabolic reflective surface 131 of a corresponding one of the annular optical elements 13, and then focused at an output optical aperture 132. The thus focused sunlight enters the light-guide plate 12, and is guided to the annular outer surface 10a of the photovoltaic chip module 10 through total internal reflection within the light-guide plate 12 and collected by the photovoltaic chip module 10.

Referring to FIGS. 6 and 7, when the sunlight impinges upon the light-incident surface 11 of the solar concentrator 1 in a direction which deviates from the direction normal to the light-incident surface 11 beyond a tolerance angle, the sunlight reflected by the parabolic reflective surface 131 of a corresponding one of the annular optical elements 13 will focus at a point deviating from the output optical aperture 132. A significant amount of the thus focused sunlight cannot enter the light-guide plate 12, causing a light leaking problem. The remainder of the thus focused sunlight, even though entering the light-guide plate 12, will concentrate at a region deviating from the central area 121 of the light-guide plate 12. In addition, the region of the light-guide plate 12 at which the sunlight concentrates has a significantly reduced irradiance uniformity.

SUMMARY

An object of the disclosure is to provide a light-modulating device to overcome the aforesaid shortcomings of the solar concentrator.

According to the disclosure, there is provided a light-modulating device adapted to be disposed on a solar concentrator which includes a light-guide plate having a central area with a central axis, a photovoltaic chip module disposed in the central area, and a plurality of annular optical elements which are concentrically disposed on the light-guide plate about the central axis and each of which has a parabolic reflective surface to reflect incident light toward the light-guide plate. The light-modulating device is of a circular shape and has a center in line of the central axis of the light-guide plate, and includes a plurality of modulating sectors. Each of the modulating sectors includes an array of optical microstructures. Each of the optical microstructures includes a plurality of elongate light-transmissive layers, which include a topmost layer, a bottommost layer, and a plurality of in-between layers.

The topmost layer extends in a first predetermined axis.

The bottommost layer extends in a last predetermined axis which turns about a center axis perpendicular to the topmost layer by a predetermined included angle, such that an incident light beam passing through the topmost layer in an incident route is modulated to permit the light beam emitting from the bottommost layer to impinge upon a corresponding one of the annular optical elements along an impinging route different from the incident route.

The in-between layers are disposed between the topmost and bottommost layers, and are sequentially turned about the center axis by an incremental degree toward the last predetermined axis so as to permit a corresponding one of the optical microstructures to modulate the incident light beam.

BRIEF DESCRIPTION OF THE DRAWINGS

Other features and advantages of the disclosure will become apparent in the following detailed description of the embodiments with reference to the accompanying drawings, of which:

FIG. 18 is a schematic top view of the solar concentrator to illustrate the propagation of the light beams in the corresponding one of the annular optical elements and the light-guide plate after the light modulation.

DETAILED DESCRIPTION

Before the disclosure is described in greater detail, it should be noted that some components are exaggeratedly shown in the figures for the purpose of convenient illustration and are not in scale.

Figure 1:
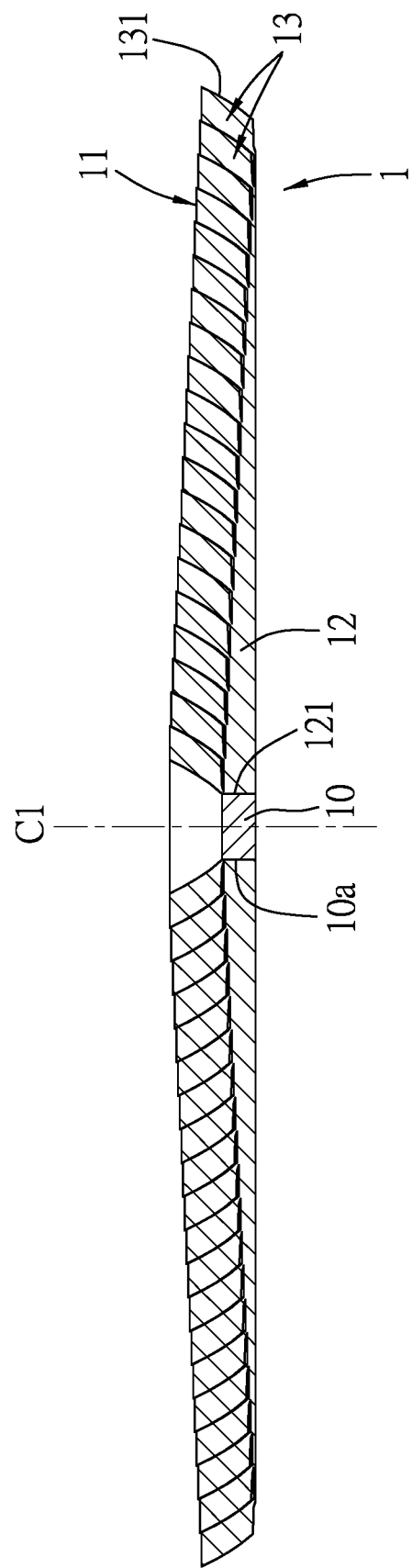
FIG. 1 is a schematic sectional view of a solar concentrator.
Figure 2:
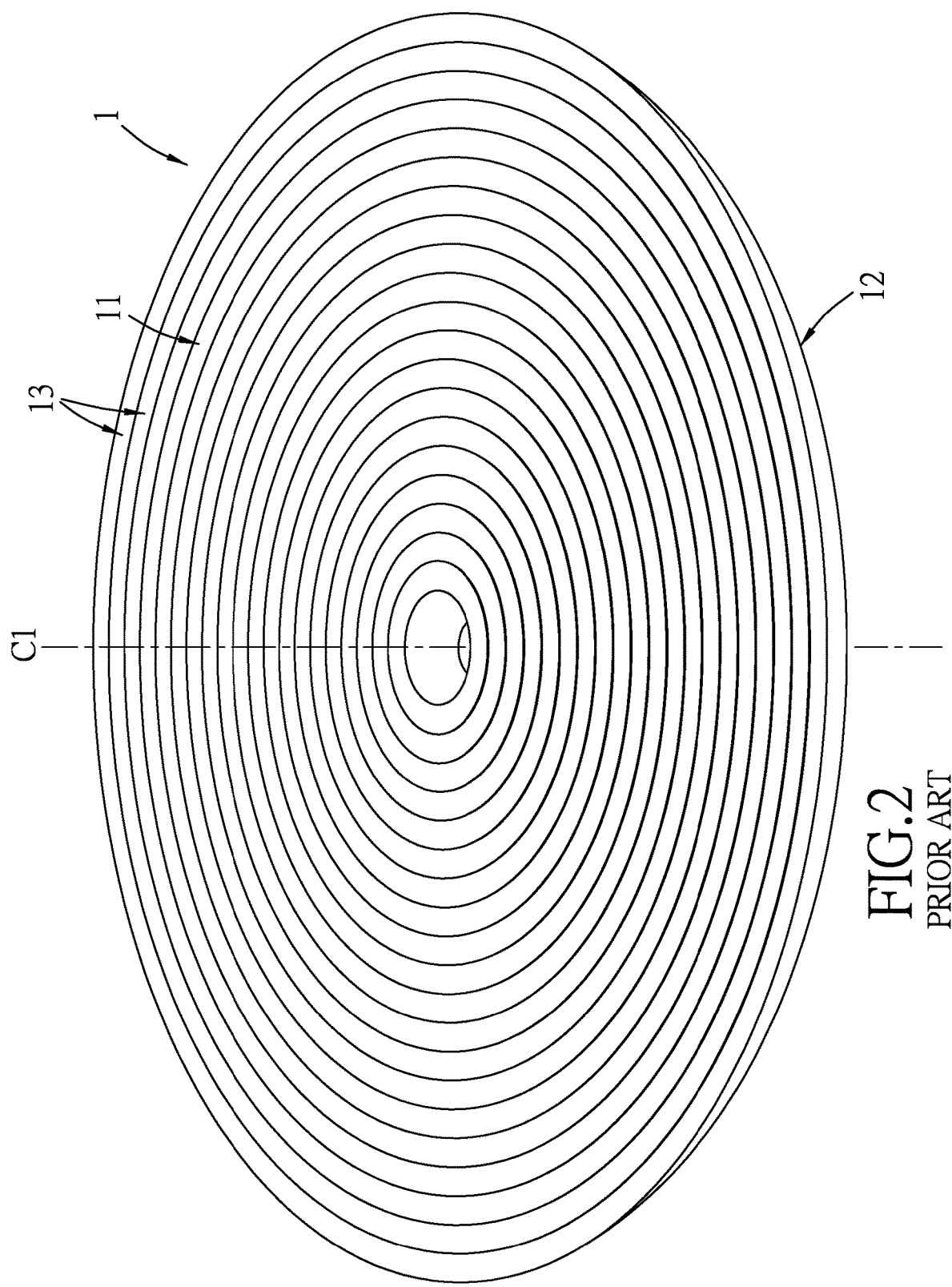
FIG. 2 is a schematic perspective view of the solar concentrator.
Figure 3:
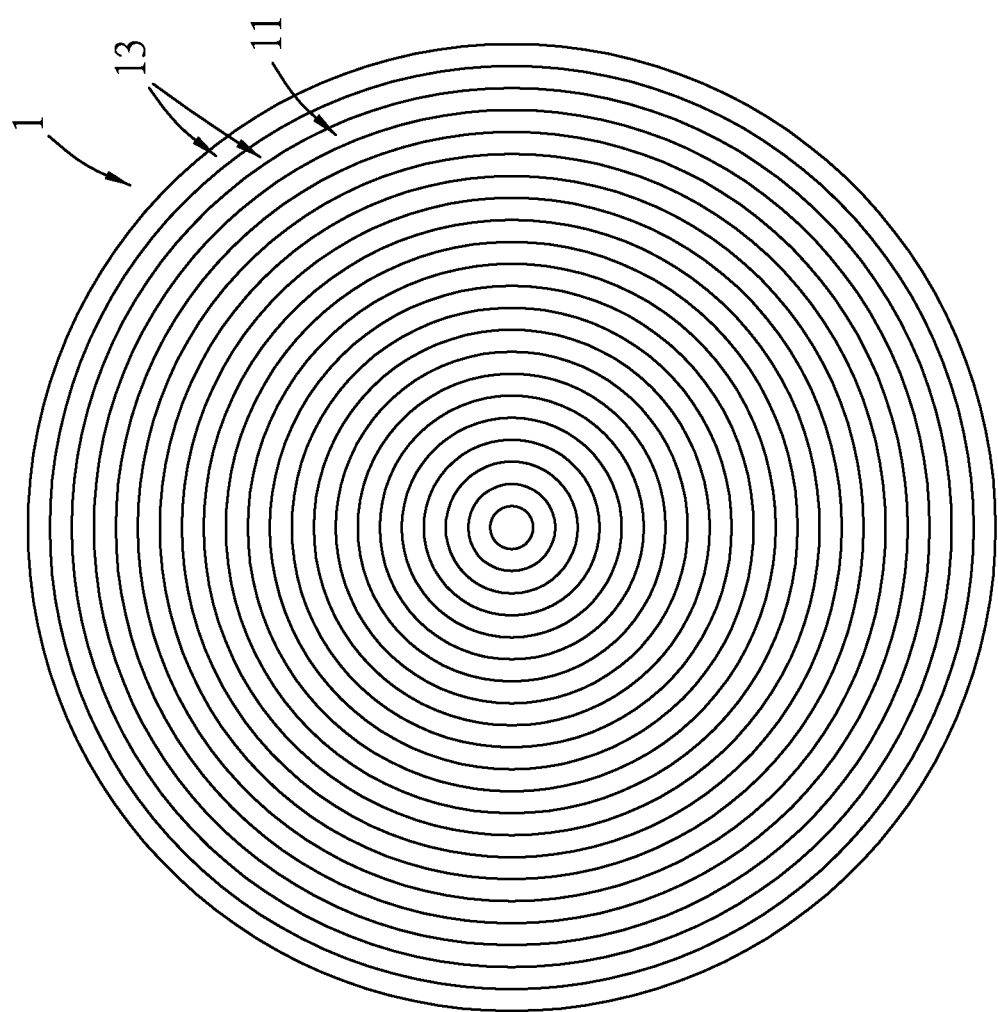
FIG. 3 is a schematic top view of the solar concentrator.
Figure 4:
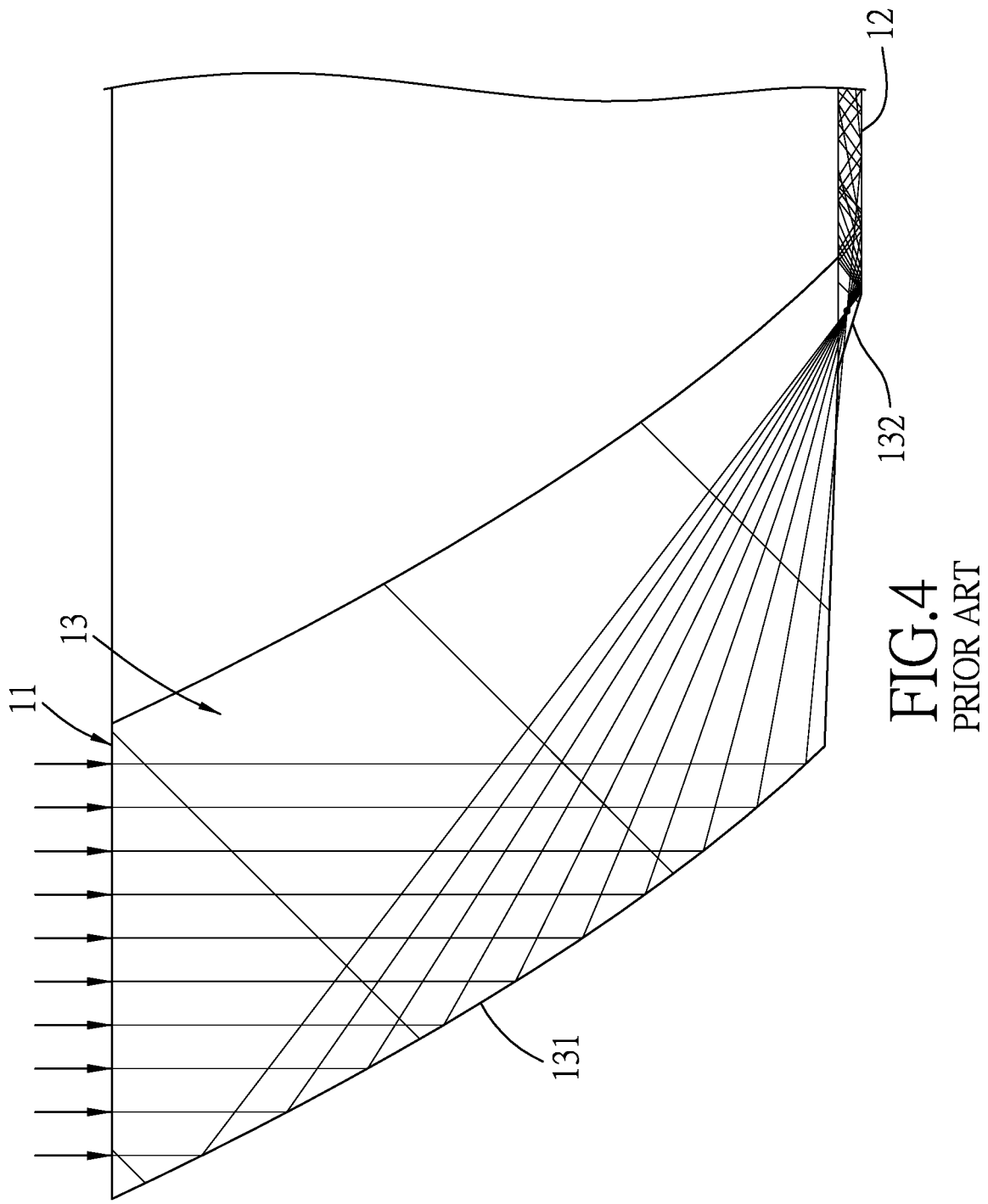
FIG. 4 is a fragmentary schematic side view of the solar concentrator to illustrate propagation of sunlight impinging upon a light-incident surface of the solar concentrator in a direction normal to the light-incident surface.
Figure 5:
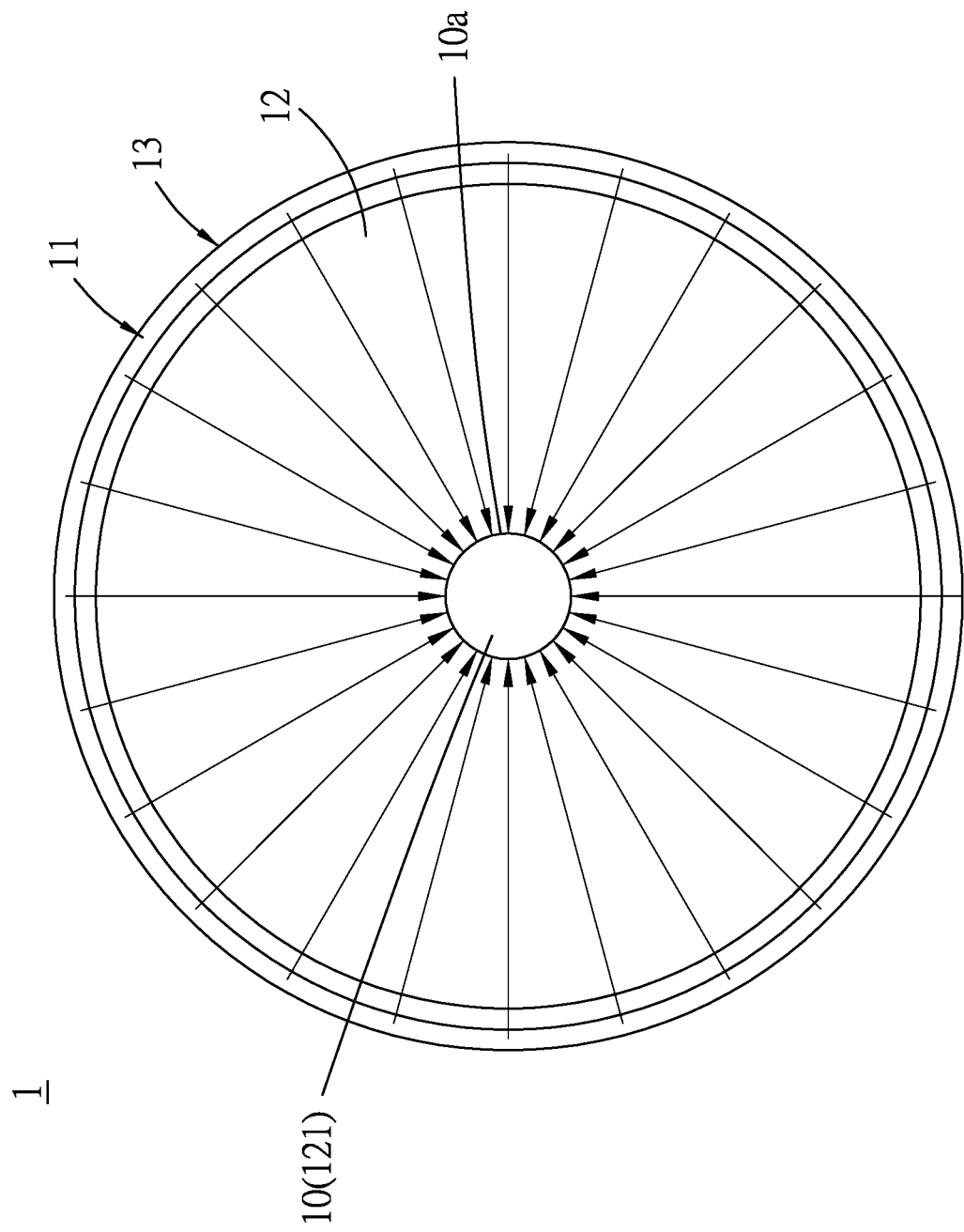
FIG. 5 is a schematic top view of the solar concentrator to illustrate the propagation of the sunlight impinging upon the light-incident surface of the solar concentrator in the direction normal to the light-incident surface.
Figure 6:
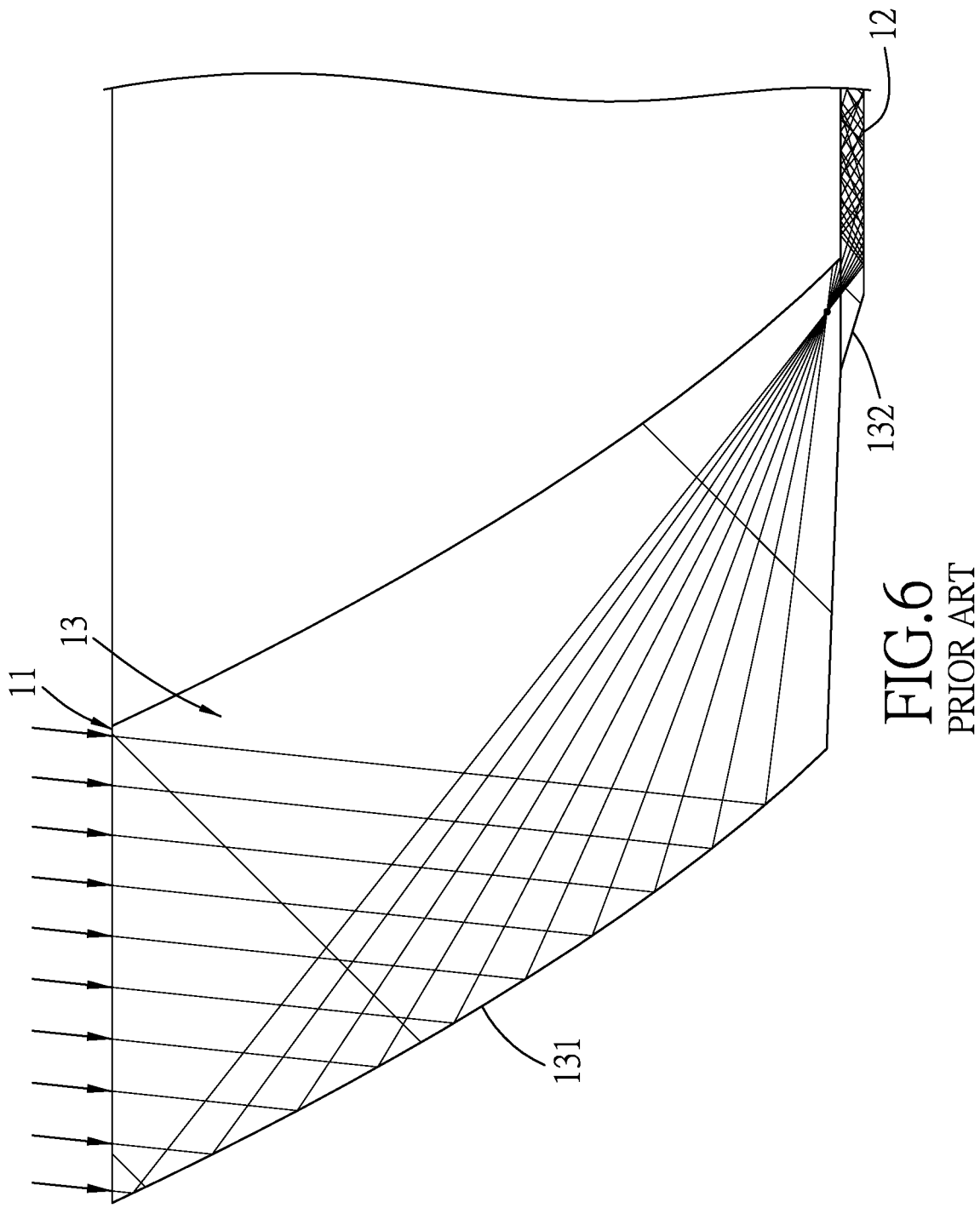
FIG. 6 is a fragmentary schematic side view of the solar concentrator to illustrate propagation of the sunlight impinging upon the light-incident surface of the solar concentrator in a direction which deviates from the direction normal to the light-incident surface beyond a tolerance angle.
Figure 7:
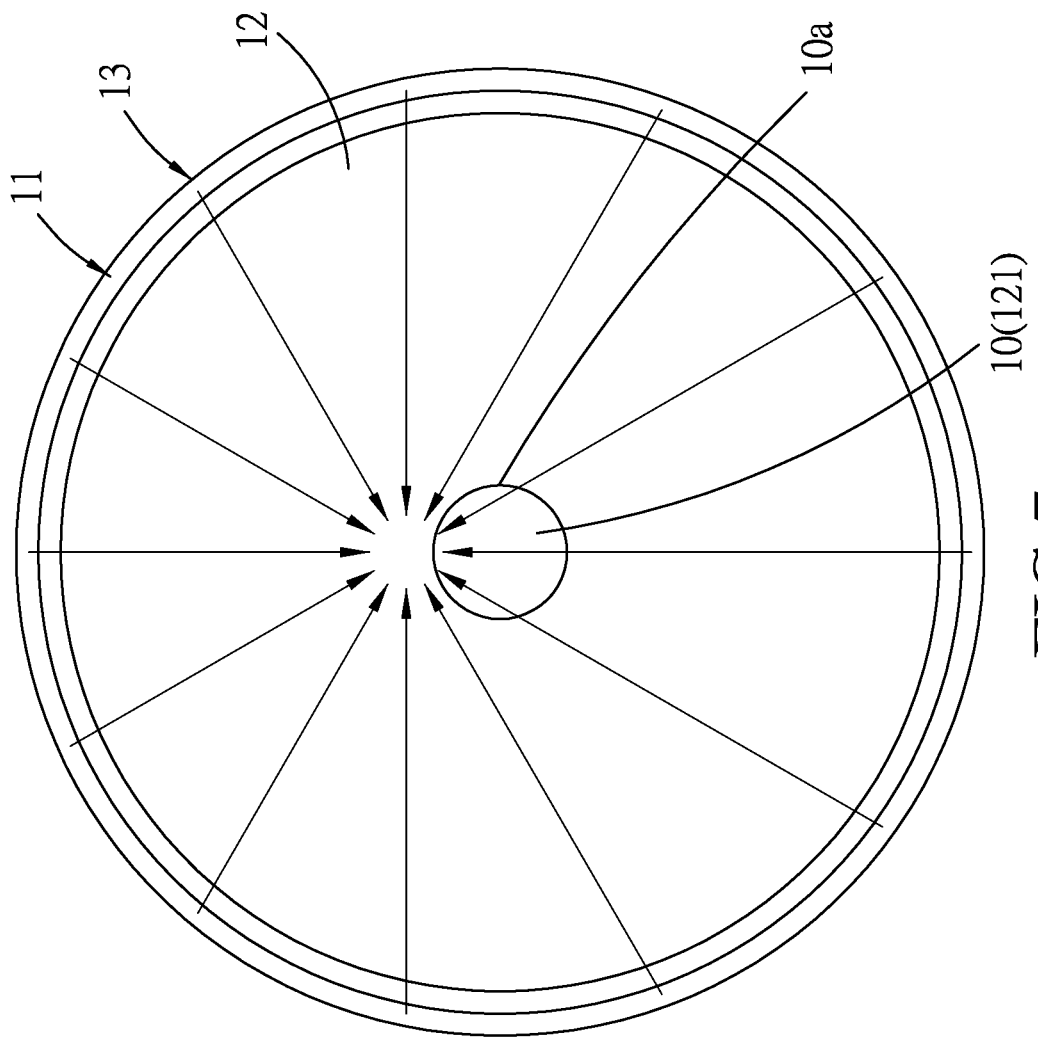
FIG. 7 is a schematic top view of the solar concentrator to illustrate the propagation of the sunlight impinging upon the light-incident surface of the solar concentrator in the direction which deviates from the direction normal to the light-incident surface beyond the tolerance angle.
Figure 8:
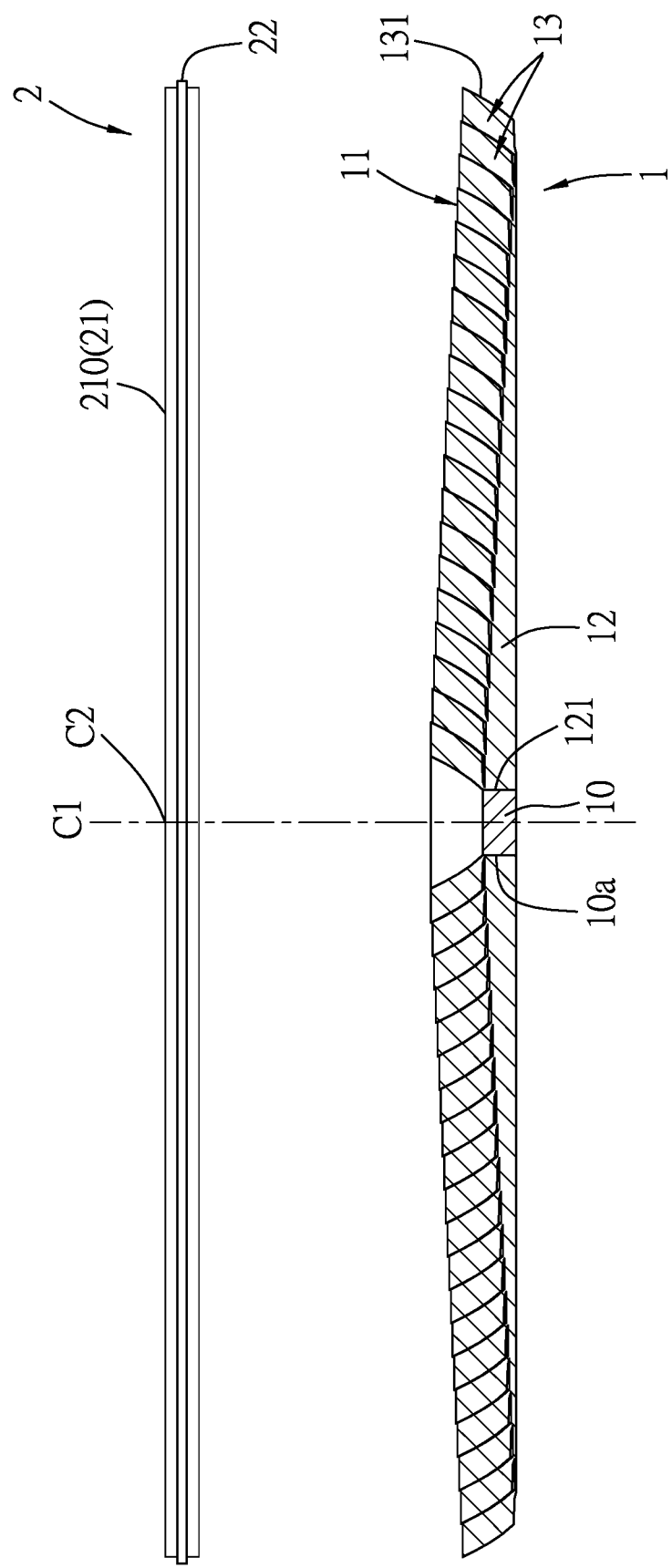
FIG. 8 is a partially sectional view illustrating an embodiment of a light-modulating device according to the disclosure to be disposed on a solar concentrator.

Referring to FIG. 8, an embodiment of a light-modulating device 2 according to the disclosure is adapted to be disposed on a solar concentrator 1.

The solar concentrator 1 includes a light-guide plate 12 having a central area 121 with a central axis (C1), a photovoltaic chip module 10 disposed in the central area 121, and a plurality of annular optical elements 13 which are concentrically disposed on the light-guide plate 12 about the central axis (C1) and each of which has a parabolic reflective surface 131 to reflect incident light (D) toward the light-guide plate 12. A light-incident surface 11 of the solar concentrator 1 is constituted by top surfaces of the annular optical elements 13. The photovoltaic chip module 10 has an annular outer surface 10a.

Referring to FIGS. 8 to 13, the light-modulating device 2 is of a circular shape 210 and has a center (C2) lined up with the central axis (C1) of the light-guide plate 12, best shown in FIG. 8, and includes a plurality of modulating sectors 210a, each of which includes an array of optical microstructures 21.

Figure 12:
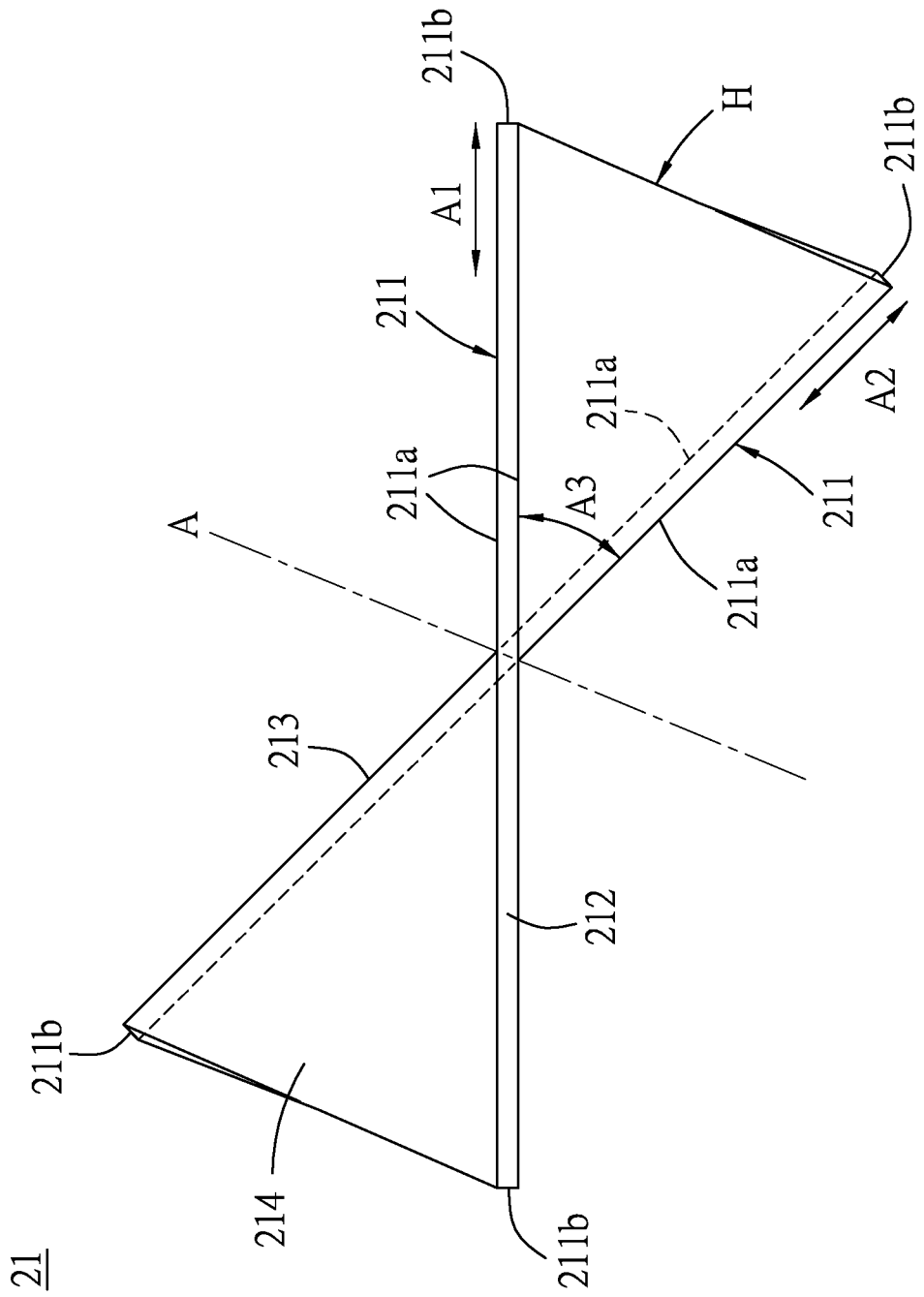
FIG. 12 is a schematic perspective view of an optical microstructure included in the embodiment of the light-modulating device.
Figure 13:
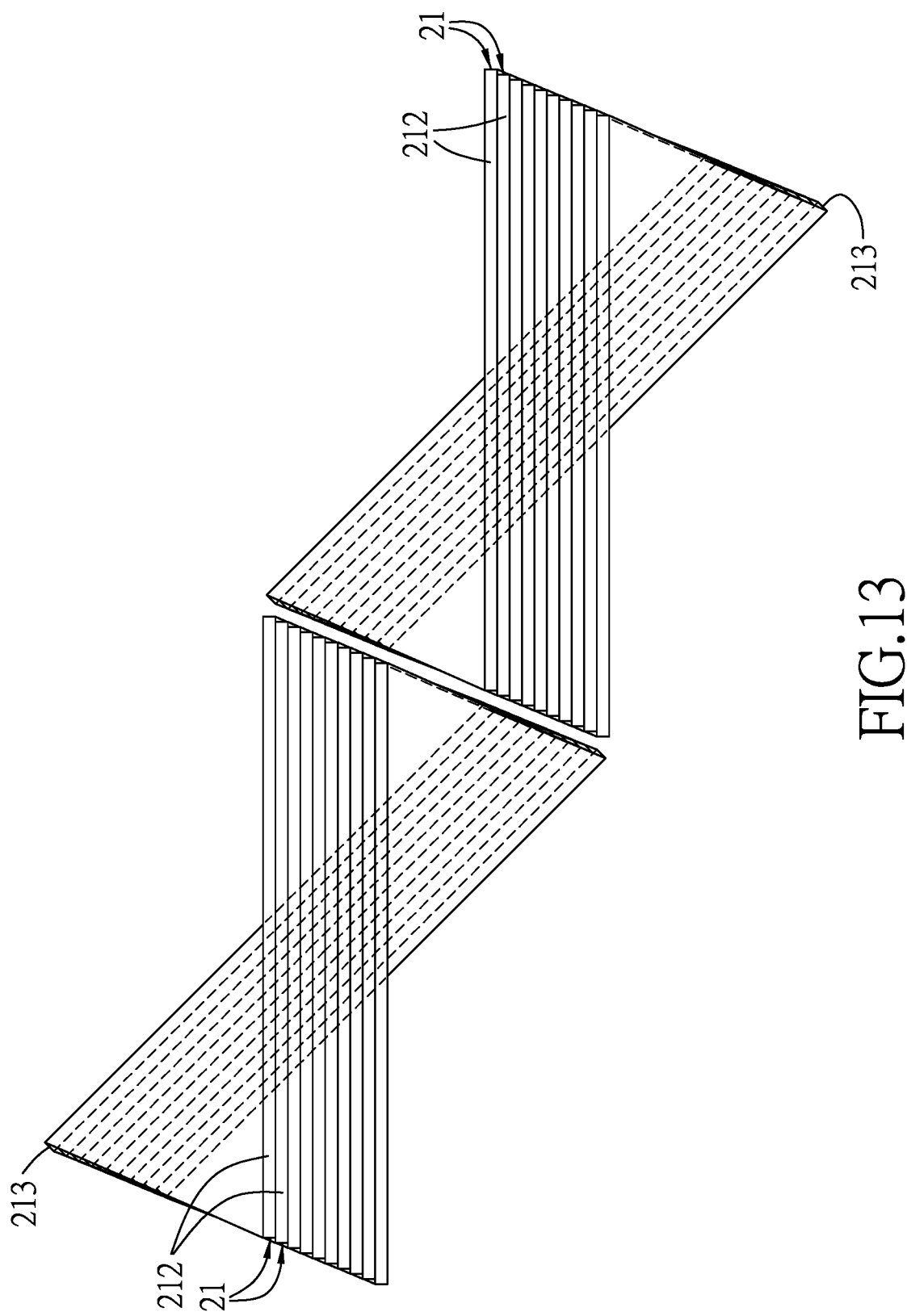
FIG. 13 is a schematic perspective view illustrating arrangement of the optical microstructures.

Referring specifically to FIG. 12, each of the optical microstructures 21 includes a plurality of elongate light-transmissive layers 211, which include a topmost layer 212, a bottommost layer 213, and a plurality of in-between layers 214.

The topmost layer 212 extends in a first predetermined axis (A1).

The bottommost layer 213 extends in a last predetermined axis (A2) which turns about a center axis (A) perpendicular to the topmost layer 212 by a predetermined included angle (A3), such that an incident light beam passing through the topmost layer 212 in an incident route (shown as arrows in FIG. 9) is modulated to permit the light beam emitting from the bottommost layer 213 (shown as arrows in FIG. 11) to impinge upon a corresponding one of the annular optical elements 13 along an impinging route (shown as arrows in FIG. 14, which will be further described in detail below) different from the incident route.

The in-between layers 214 are disposed between the topmost and bottommost layers 212, 213, and are sequentially turned about the center axis (A) by an incremental degree toward the last predetermined axis (A2) so as to permit a corresponding one of the optical microstructures 21 to modulate the incident light beam.

Figure 9:
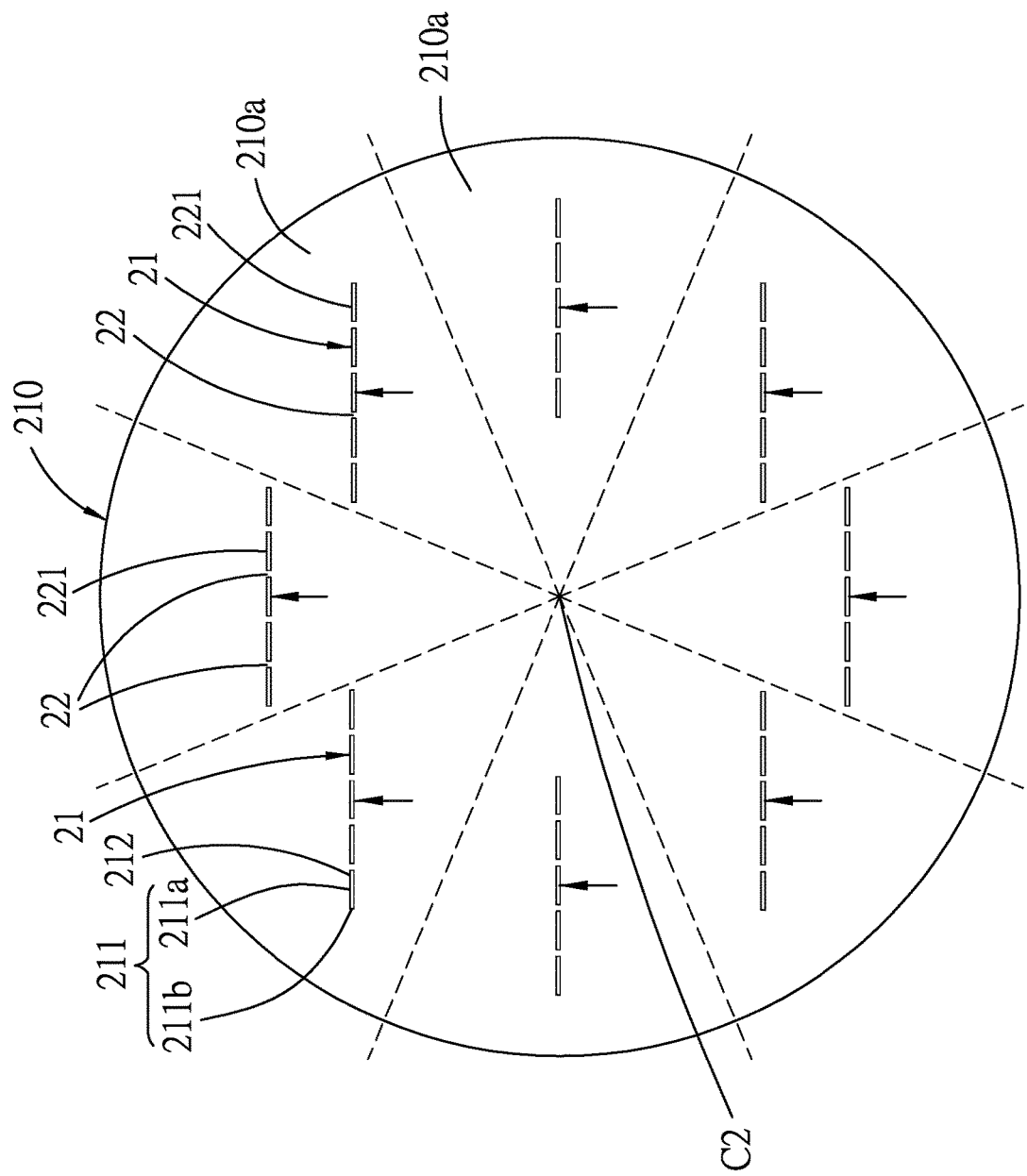
FIG. 9 is a schematic top view of the embodiment of the light-modulating device.
Figure 11:
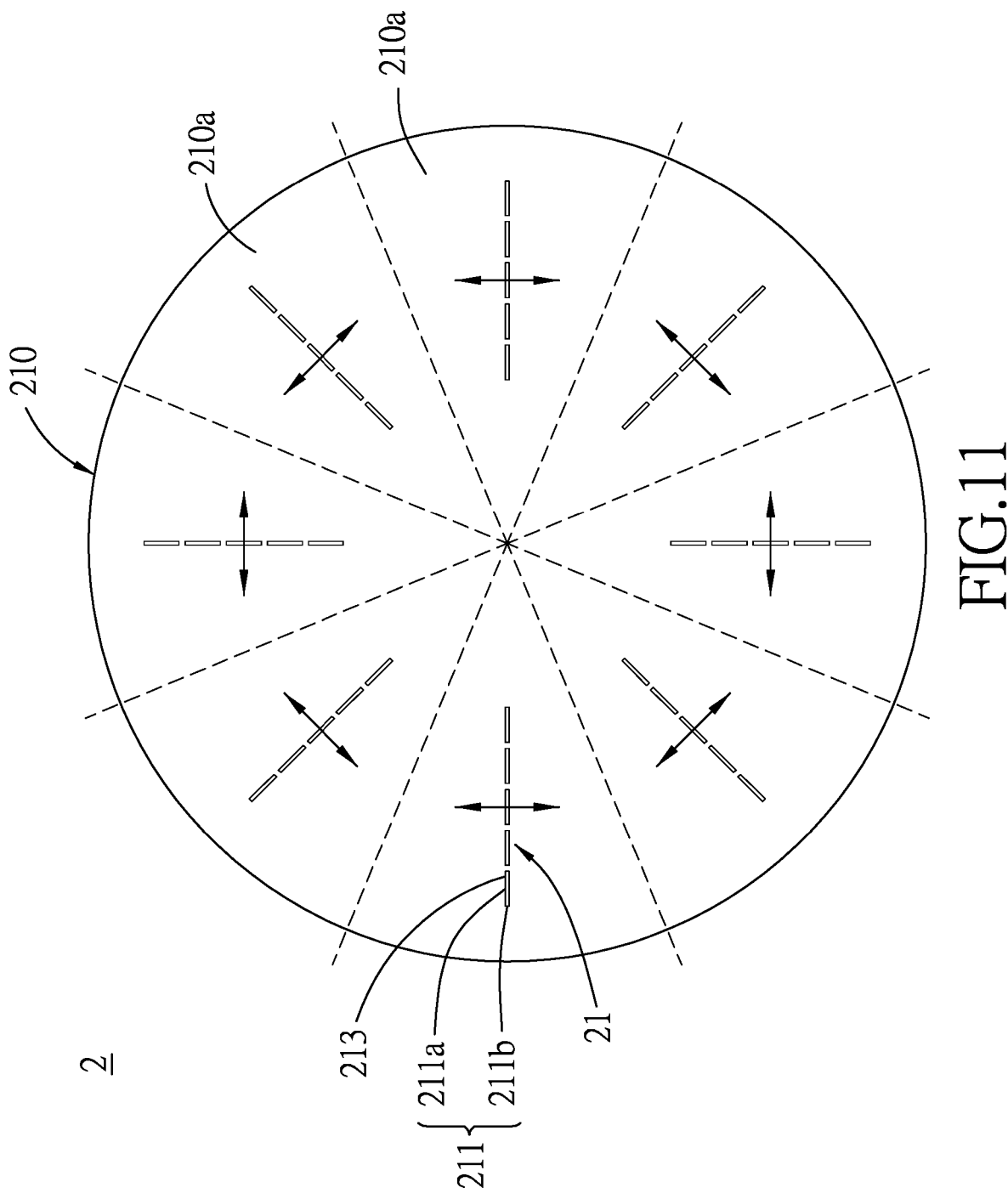
FIG. 11 is a schematic bottom view of the embodiment of the light-modulating device.

Referring specifically to FIGS. 9, 11, and 12, the first predetermined axes (A1) of the topmost layers 212 of the optical microstructures 21 of the modulating sectors 210a are oriented to be parallel to each other. The predetermined included angles (A3) defined between the topmost and bottommost layers 212, 213 of the optical microstructures 21 in the same one of the modulating sectors 210a are the same, and the predetermined included angles (A3) defined between the topmost and bottommost layers 212, 213 of the optical microstructures 21 in different ones of the modulating sectors 210a may be different, such that the last predetermined axes (A2) of the bottommost layers 213 of the optical microstructures 21 in different ones of the modulating sectors 210a may be oriented in different directions. In the embodiment, the last predetermined axis (A2) of the bottommost layer 213 of each of the optical microstructures 21 of the modulating sectors 210a is oriented in a substantially radial direction.

While the number of the modulating sectors 210a included in the light-modulating device 2 in the embodiment shown in FIGS. 9 and 11 is eight, it may be adjusted according to the specific requirements. Generally, the more the number of the modulating sectors 210a, the better the light modulating effect of the light-modulating device 2.

Referring specifically to FIG. 12, each of the optical microstructures 21 have a height (H) along the center axis (A). Each of the elongate light-transmissive layers 211 of each of the optical microstructures 21 has a width 211b and a length 211a. A ratio of the height (H) to the width 211b is greater than 20 such that the number of the total internal reflection of the incident light beam within the optical microstructures 21 can be increased so as to modulate the incident light beam more effectively. In the embodiment, each of the optical microstructures 21 has the height (H) of 51 mm, the length 211a of 1 mm, and the width 211b of 0.02 mm. It should be noted that the dimension of the optical microstructures 21 can be adjusted according to specific requirements.

The optical microstructures 21 have a refractive index greater than 1.4 so as to permit the incident light beam passing through the topmost layer 212 to undergo the total internal reflection within the optical microstructures 21. For example, the optical microstructures 21 may be made from polymethyl methacrylate, which has a refractive index of 1.5.

Figure 10:
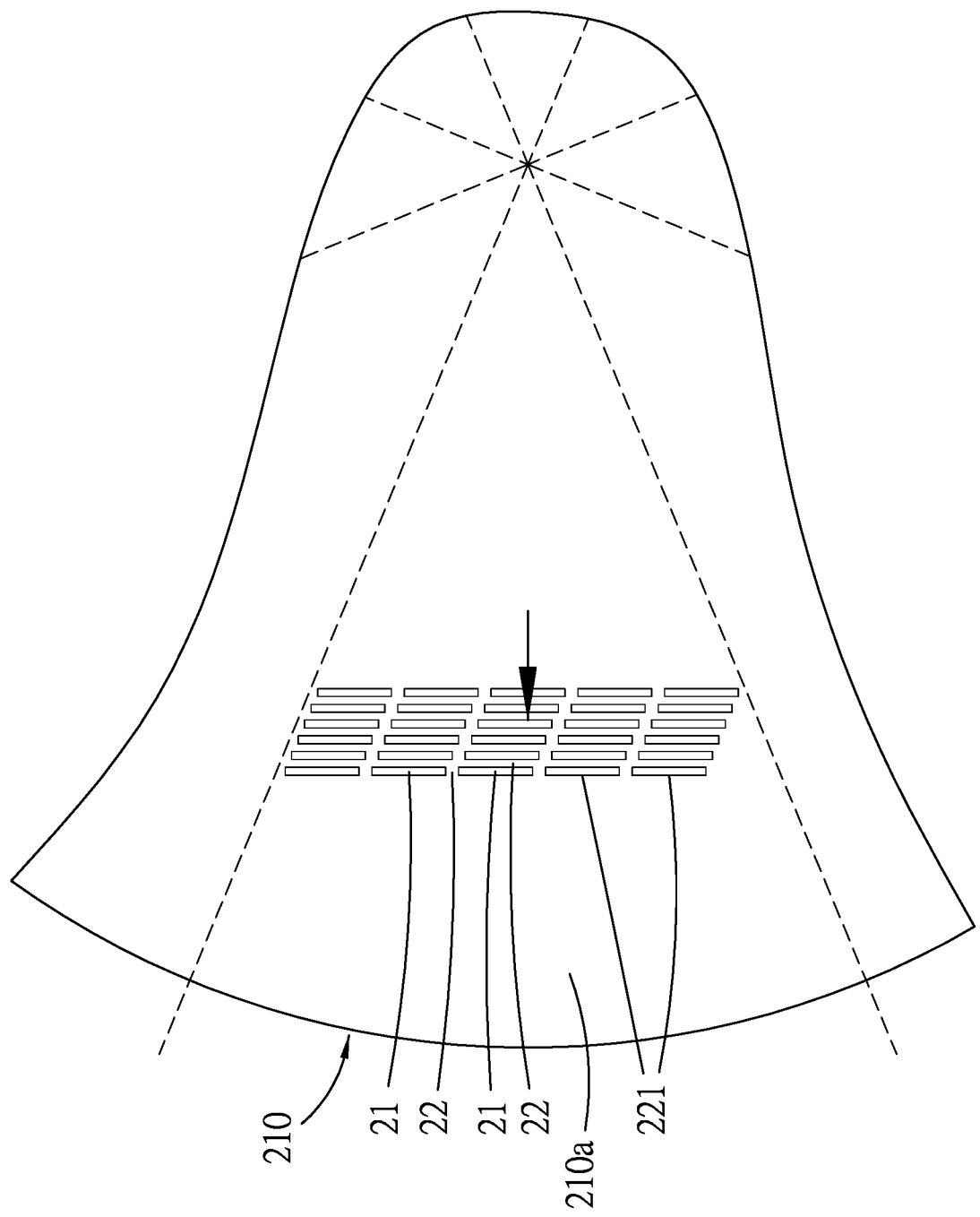
FIG. 10 is a fragmentary top view of the embodiment of the light-modulating device.

Referring specifically to FIGS. 8 and 10, the light-modulating device 2 further includes a retaining member 22 for retaining the optical microstructures 21 of the modulating sectors 210a in positions. Specifically, the retaining member 22 has an array of elongate apertures 221 for retaining the optical microstructures 21 of the modulating sectors 210a, respectively. The retaining member 22 may be made from a material which is opaque or which has a refractive index lower than that of the optical microstructures 21. For example, the retaining member 22 may be made from an optical clear adhesive having a refractive index lower than that of the optical microstructures 21 as long as the total internal reflection of the incident light beam within the optical microstructures 21 is not impaired.

In addition, in order to arrange the optical microstructures 21 more densely, the lengths 211a of the elongate light-transmissive layers 211 of the optical microstructure 21 can be adjusted along the center axis (A). For example, the lengths 211a of the elongate light-transmissive layers 211 of the optical microstructure 21 are decreased gradually from the topmost layer 212 toward a middle one of the in-between layers 214 and are then increased gradually from the middle one of the in-between layers 214 toward the bottommost layer 213 along the center axis (A).

Figure 14:
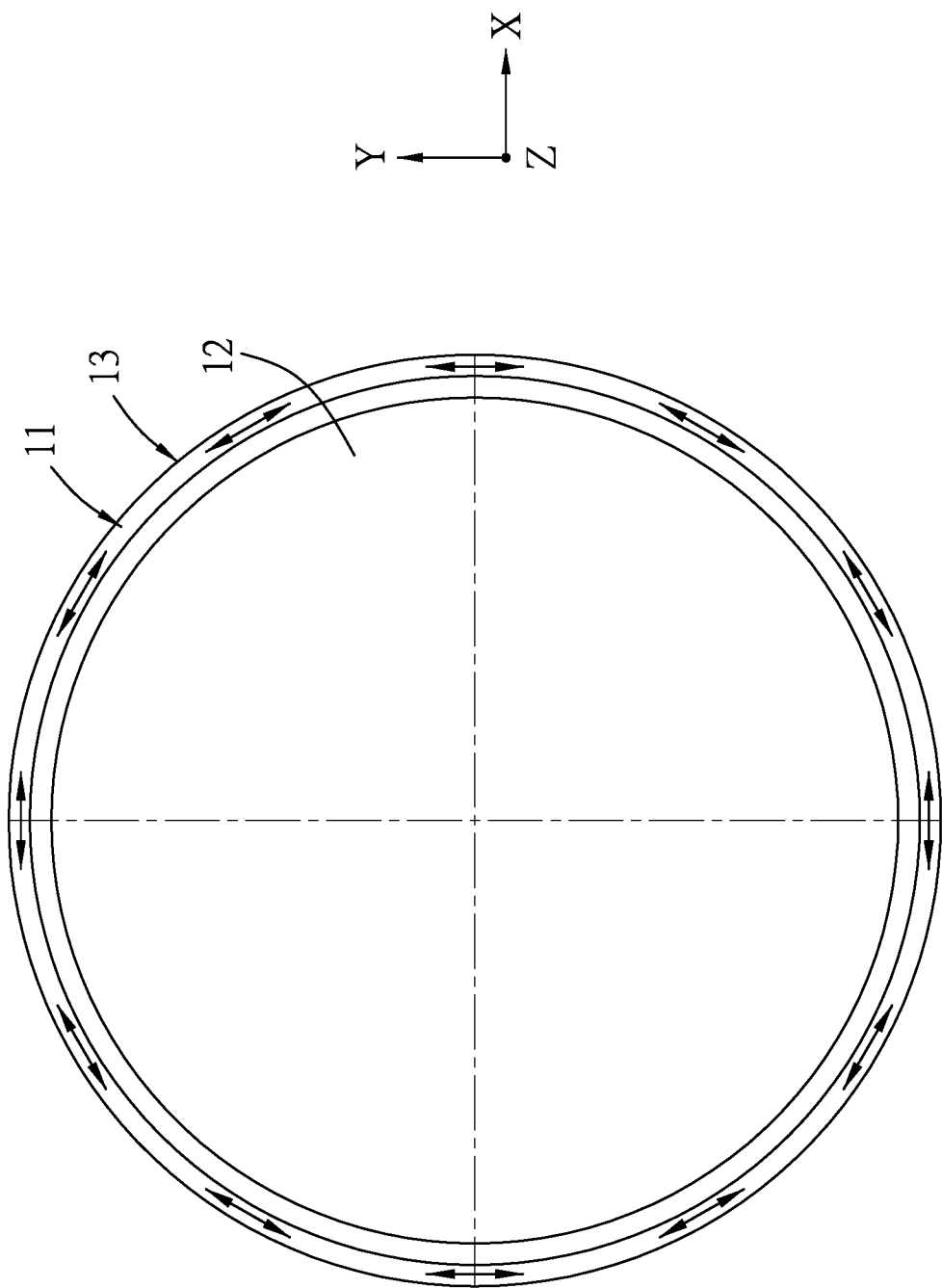
FIG. 14 is a schematic top view of the solar concentrator to illustrate impinging routes of light beams which impinge upon a corresponding one of annular optical elements of the solar concentrator after light modulation.
Figure 15:
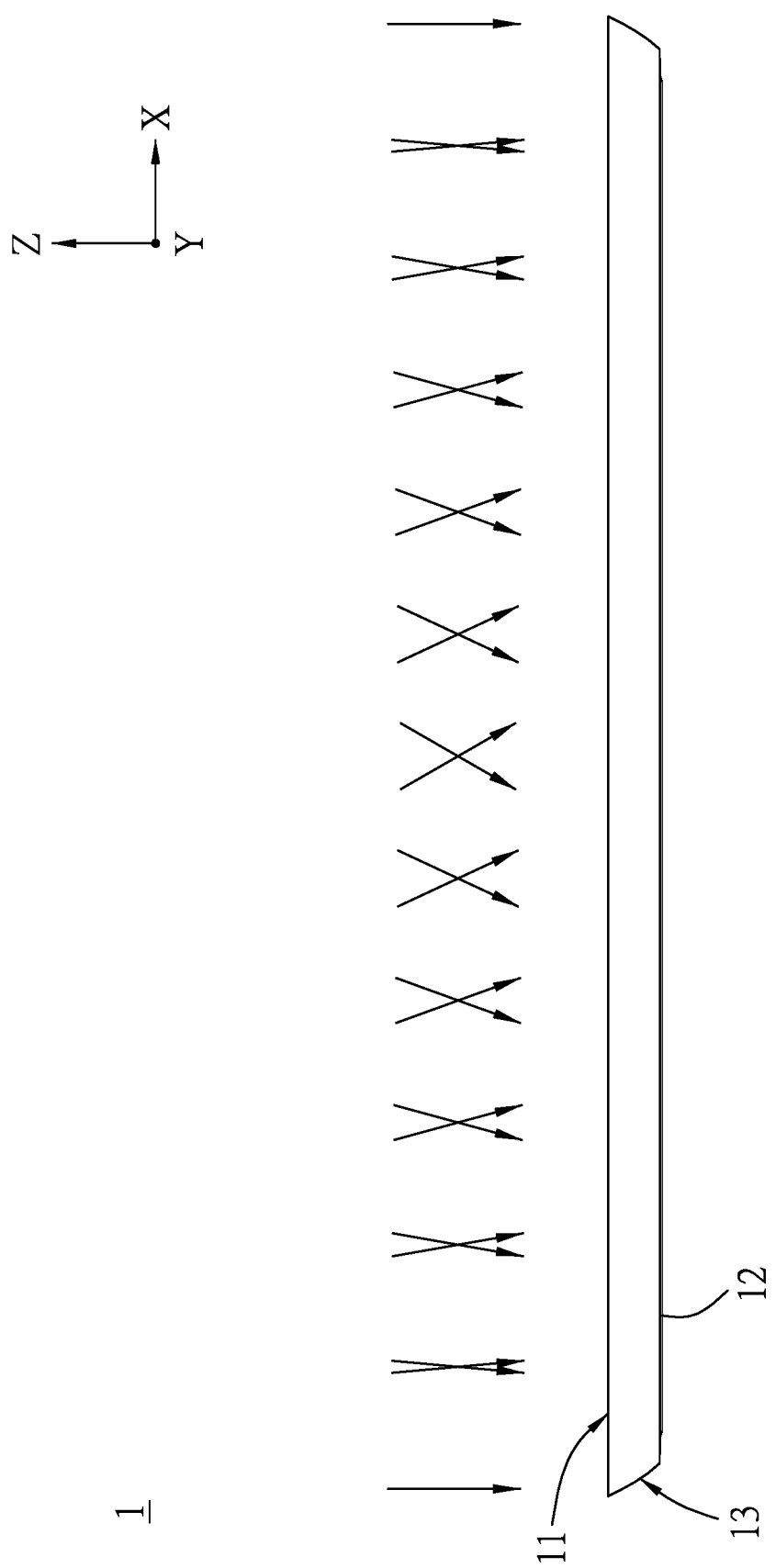
FIG. 15 a schematic side view of the solar concentrator to illustrate the impinging routes of the light beams after the light modulation.
Figure 16:
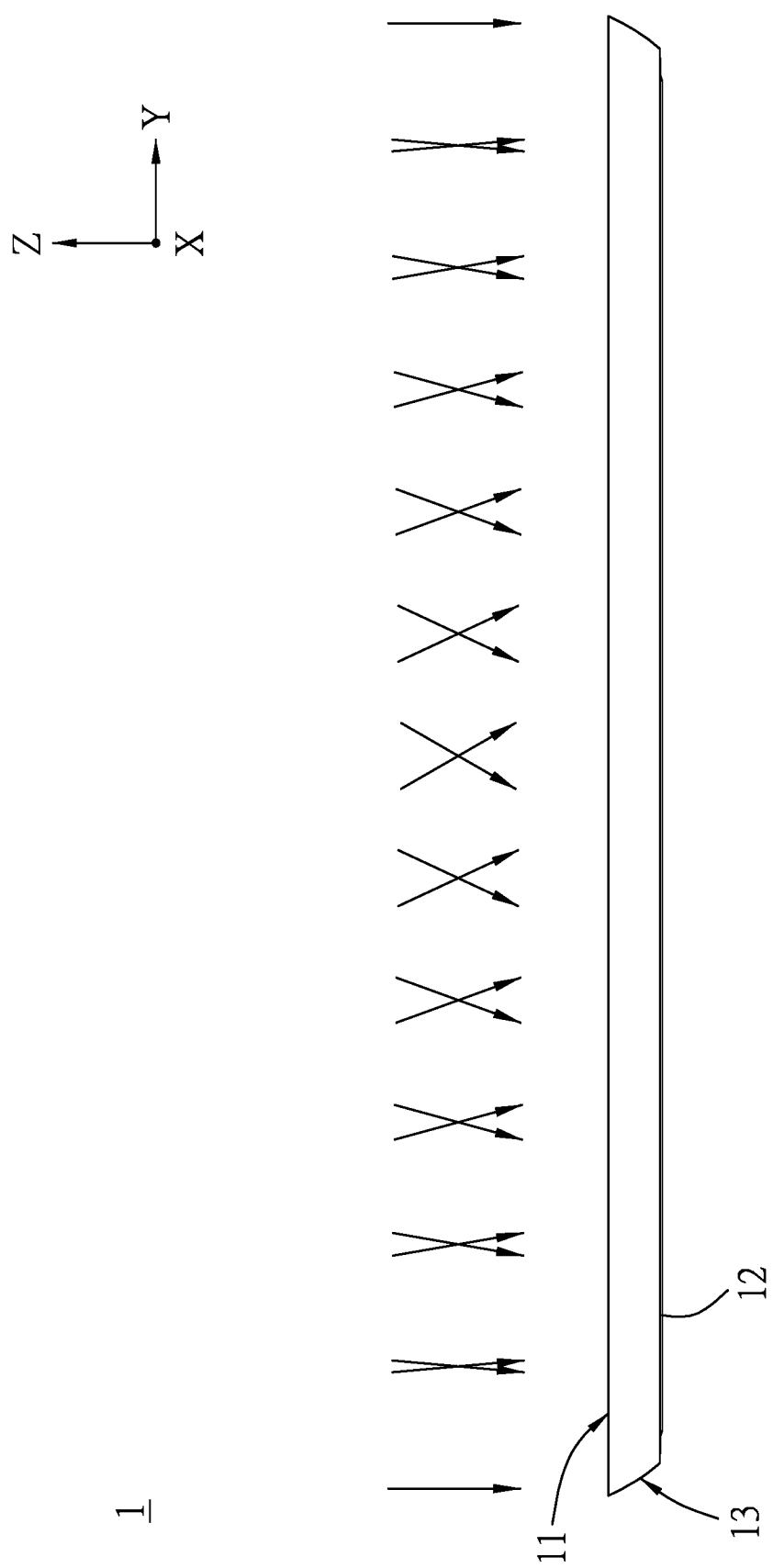
FIG. 16 an another schematic side view of the solar concentrator to illustrate the impinging routes of the light beams after the light modulation.
Figure 17:
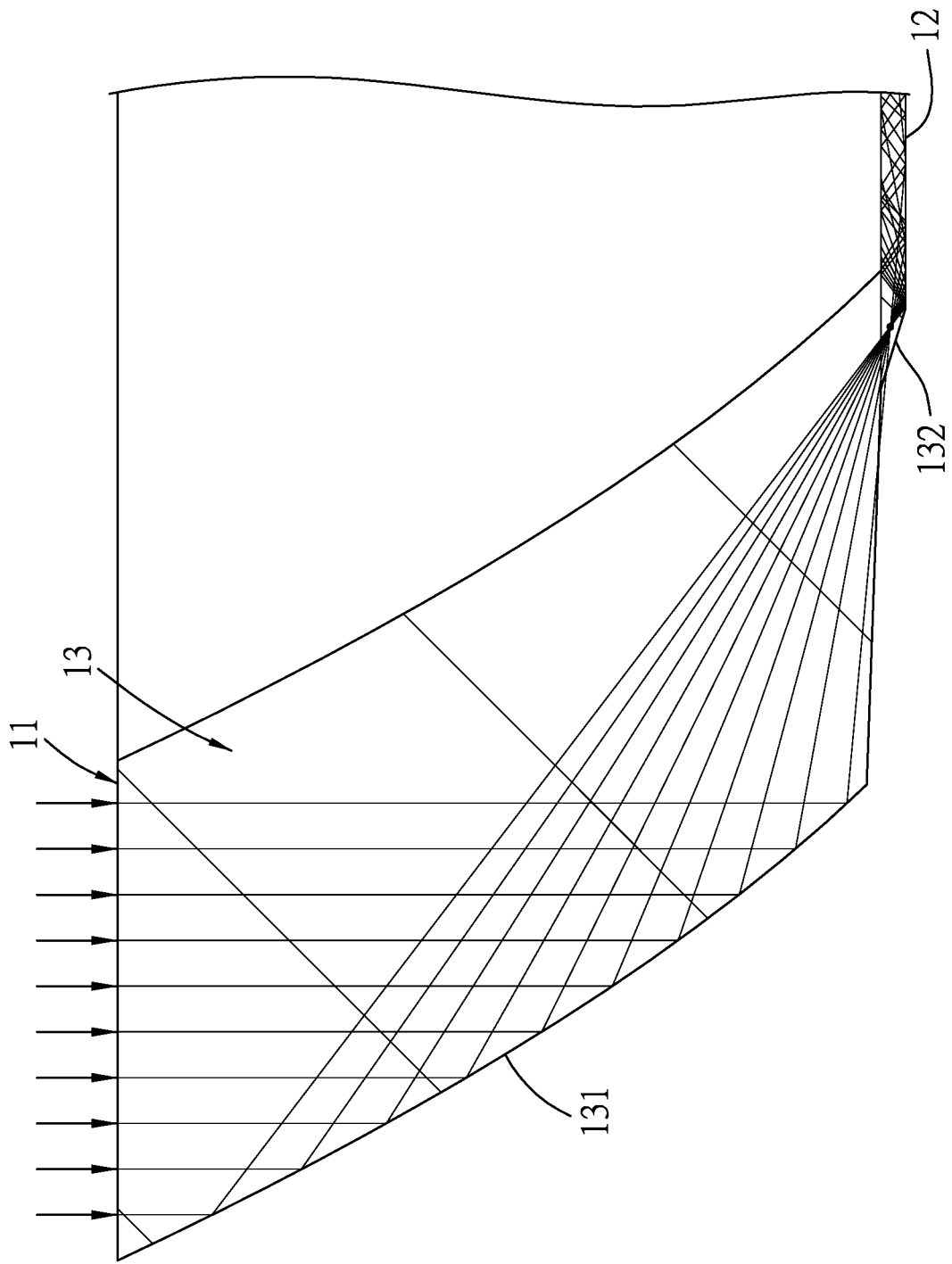
FIG. 17 is a fragmentary schematic side view of the solar concentrator to illustrate propagation of the light beams in the corresponding one of the annular optical elements and the light-guide plate after the light modulation.

Referring to FIGS. 9, 11 and 14 to 18, after the incident light beams passing through the topmost layers 212 of the optical microstructures 21 are modulated, the light beams emitting from the bottommost layers 213 of the optical microstructure 21 can impinge upon a corresponding one of the annular optical elements 13 along the impinging route substantially tangential to the corresponding one of the annular optical elements 13, best shown in FIG. 14. The light beams can be guided through the annular optical elements 13, reflected by the parabolic reflective surface 131 of a corresponding one of the annular optical elements 13, and then focused at an output optical aperture 132. The thus focused light beam enters the light-guide plate 12, and is guided toward the central area 121 of the light-guide plate 12 through the total internal reflection within the light-guide plate 12. Therefore, the aforesaid light leaking problem of the solar concentrator 1 can be reduced significantly. In addition, although the light beam may not be concentrated at a center of the light-guide plate 12, it can be guided to the annular outer surface 10a of the photovoltaic chip module 10.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A light-modulating device adapted to be disposed on a solar concentrator which includes a light-guide plate having a central area with a central axis, a photovoltaic chip module disposed in the central area, and a plurality of annular optical elements which are concentrically disposed on the light-guide plate about the central axis and each of which has a parabolic reflective surface to reflect incident light toward the light-guide plate, the light-modulating device being in a circular shape and having a center lined up with the central axis of the light-guide plate, and comprising:
   a plurality of modulating sectors each including an array of optical microstructures, each of which includes a plurality of elongate light-transmissive layers, which include
   a topmost layer extending in a first predetermined axis,
   a bottommost layer extending in a last predetermined axis which turns about a center axis perpendicular to said topmost layer by a predetermined included angle, such that a light beam incident on and passing through said topmost layer in an incident route is modulated to permit the light beam emitting from said bottommost layer to impinge upon a corresponding one of the annular optical elements along an impinging route different from the incident route, and
   a plurality of in-between layers which are disposed between said topmost and bottommost layers of said each of said optical microstructures, and which are sequentially turned about the center axis by an incremental degree toward the last predetermined axis so as to permit a corresponding one of said optical microstructures to modulate the light beam,
   wherein the first predetermined axes of said topmost layers of said optical microstructures of said modulating sectors are oriented to be parallel to each other, and
   wherein the last predetermined axis of said bottommost layer of each of said optical microstructures of said modulating sectors is oriented in a substantially radial direction directed toward the center of the light-modulating device.

2. The light-modulating device according to claim 1, further comprising a retaining member for retaining said optical microstructures of said modulating sectors in positions.

3. The light-modulating device according to claim 2, wherein said retaining member has an array of elongate apertures for retaining said optical microstructures of said modulating sectors, respectively.

4. The light-modulating device according to claim 2, wherein said retaining member is made from an optical clear adhesive.

5. The light-modulating device according to claim 1, wherein the impinging route is substantially tangential to the corresponding one of the annular optical elements.

6. The light-modulating device according to claim 1, wherein each of said optical microstructures have a height along the center axis, each of said elongate light-transmissive layers of each of said optical microstructures has a width, and a ratio of the height to the width is greater than 20.

7. The light-modulating device according to claim 1, wherein said optical microstructures have a refractive index greater than 1.4.

8. The light-modulating device according to claim 1, wherein said optical microstructures are made from polymethyl methacrylate.

* * * * *